(12) United States Patent
Cook

(10) Patent No.: US 8,250,310 B2
(45) Date of Patent: Aug. 21, 2012

(54) ASSIGNING DATA TO NVRAM OF SHARED ACCESS HYBRID HARD DRIVES

(75) Inventor: Steven D. Cook, Saint Paul, OR (US)

(73) Assignee: International Business Machines Corporation, Armonk, NY (US)

( * ) Notice: Subject to any disclaimer, the term of this patent is extended or adjusted under 35 U.S.C. 154(b) by 757 days.

(21) Appl. No.: 12/183,682

(22) Filed: Jul. 31, 2008

(65) Prior Publication Data

US 2010/0030981 A1 Feb. 4, 2010

(51) Int. Cl.
*G06F 12/00* (2006.01)
(52) U.S. Cl. ............... 711/145; 711/144; 711/135
(58) Field of Classification Search ............ 711/4, 103, 711/111, 158, 159, 135, 173, 145, 144
See application file for complete search history.

(56) References Cited

U.S. PATENT DOCUMENTS

| | | | |
|---|---|---|---|
| 6,243,795 B1 | 6/2001 | Yang et al. | |
| 6,467,022 B1 | 10/2002 | Buckland et al. | |
| 6,516,426 B1 | 2/2003 | Forehand et al. | |
| 6,567,889 B1 | 5/2003 | DeKoning et al. | |
| 6,629,211 B2 | 9/2003 | McKnight et al. | |
| 6,799,244 B2 | 9/2004 | Tanaka et al. | |
| 6,954,824 B2 | 10/2005 | Burton et al. | |
| 6,957,302 B2 | 10/2005 | Fairchild | |
| 6,981,093 B2 | 12/2005 | Minowa et al. | |
| 7,035,974 B2 | 4/2006 | Shang | |
| 7,082,495 B2 * | 7/2006 | DeWhitt et al. | 711/113 |
| 7,130,962 B2 | 10/2006 | Garney | |
| 2003/0177305 A1 | 9/2003 | Hetrick | |
| 2005/0132129 A1 * | 6/2005 | Venkiteswaran | 711/103 |
| 2006/0080471 A1 | 4/2006 | Powell et al. | |

* cited by examiner

*Primary Examiner* — Hong Kim
(74) *Attorney, Agent, or Firm* — Lieberman & Brandsdorfer, LLC

(57) ABSTRACT

A method, apparatus, and article of manufacture are provided for managing a hybrid storage device based upon the properties associated therewith. The storage device includes flash memory and physical storage. Select data is written to the flash memory and is not subject to flushing to the physical storage, and select data is either written directly to the physical storage or written to the flash memory and is subject to flushing to the physical storage.

20 Claims, 5 Drawing Sheets

ASSIGNING DATA TO NVRAM OF SHARED ACCESS HYBRID HARD DRIVES

BACKGROUND OF THE INVENTION

1. Technical Field

This invention relates to hybrid storage media and management of data stored thereon. More specifically, the invention relates to designating a first class of data to be retained on the non-volatile RAM (NVRAM) section of the storage media and a second class of data to be flushed from the NVRAM section to the physical data storage section of the hybrid storage media.

2. Description of the Prior Art

Non-volatile memory is computer memory that can retain stored information when power is not delivered to the memory. In a computer system, non-volatile memory is commonly found in the form of a hard disk, a floppy disk, or a flash drive. A hard disk is a magnetic disk on which a computer stores digitally encoded data. In general, a hard drive is a form of non-volatile memory that can retain stored information with or without power. Non-volatile memory may also be found in random access memory (RAM) and is known in the art as non-volatile random access memory (NVRAM). There are different types of NVRAM, including DRAM, SRAM, and flash memory. DRAM (dynamic random access memory) is a type of random access memory that stores each bit of data in a separate capacitor within an integrated circuit. Since capacitors leak charge, the information eventually fades unless the capacitor charge is periodically refreshed. SRAM (static random access memory) is a type of semiconductor memory that used bi-stable laching circuitry to store each bit. Data is eventually lost when the memory is not powered over a period of time. DRAM and SRAM both require power in order to maintain their data over an extended period of time. Flash memory is another form of non-volatile memory that can be electrically erased and reprogrammed. It is a technology that is primarily used in memory cards and USB flash drives. More specifically, flash memory is a specific type of EEPROM (electrically erasable programmable read-only memory) that is erased and programmed in large blocks. Accordingly, non-volatile memory can be found in various forms that support retention of data without delivery of power.

As noted above, hard disk drives are known in the art of computer systems to store data. A hybrid hard disk drive (HHD) is a hard disk drive with a buffer that uses NVRAM to cache data and a physical drive for permanent storage of data, hereinafter referred to as a physical drive. It is known in the art for the operating system to load data from the flash memory first when booting. This accomplishes at least two elements, speeding up boot time and reducing power consumption by removing the need to quickly spin up the drive. Depending on the caching protocol of the HHD, it is known in the art to flush data from the buffer to the physical drive. The physical drive will only need to spin up when the buffer nears its capacity or when the data required from the hard drive is not already stored in the buffer. Since the HHD utilizes NVRAM as opposed to RAM, the buffer is able to retain data in the event of power failure.

It is known in the art that all HHDs flush all of the data from the buffer to the physical drive. Different caching protocols are employed to dictate how and when the flush occurs. In the prior art, it is not possible to designate data that should be retained exclusively in the buffer and not subject to flushing to the physical drive. However, it is desirable in limited circumstances to retain specific data in the buffer without flushing such data to the physical drive. Accordingly, there is a need for an interface that retains designated data in the buffer, while allowing non-designated data to be flushed from the buffer to the physical drive.

SUMMARY OF THE INVENTION

This invention comprises a method, system, and article of manufacture for managing a hybrid storage device. The innate properties of the different section of the storage device are leveraged for management of data stored therein.

In one aspect, a method is provided for managing storage media. A system is configured with a server in communication with a hybrid storage media. The hybrid storage media includes a physical section and a separate NVRAM section. A first class of data is assigned to be exclusively retained in the NVRAM section of the hybrid storage media. Similarly, a second class of data is assigned to be retained in the physical section of the hybrid storage media. Accordingly, based upon the assignment, the first class of data is retained in the NVRAM section of the hybrid storage media.

In another aspect of the invention, a computer system is provided with a server in communication with a storage network. At least one hybrid storage device is in the storage network. The hybrid storage device has a NVRAM section and a separate physical section. A manager is provided to categorize data for presentation to an interface. A first a category of data is designated to be retained exclusively in the NVRAM section of the storage device, and a second category of data is designated to be retained exclusively in the physical storage. An interface in communication with the NVRAM section is provided to select a channel for communication of data from the server to the storage media.

In yet another aspect of the invention, an article is provided with a computer readable carrier including computer program instructions configured to manager storage media. Instructions are provided to configure a hybrid storage device with a physical section and a separate NVRAM section. Additionally, instructions are provided to manage flushing of data from the NVRAM section to the physical section. A first class of data is designated for assignment to the NVRAM section and a second class of data is designated for assignment to the physical section. The first class of data is retained exclusively in the NVRAM section.

Other features and advantages of this invention will become apparent from the following detailed description of the presently preferred embodiment of the invention, taken in conjunction with the accompanying drawings.

DESCRIPTION OF THE PREFERRED EMBODIMENT

Figure 1:
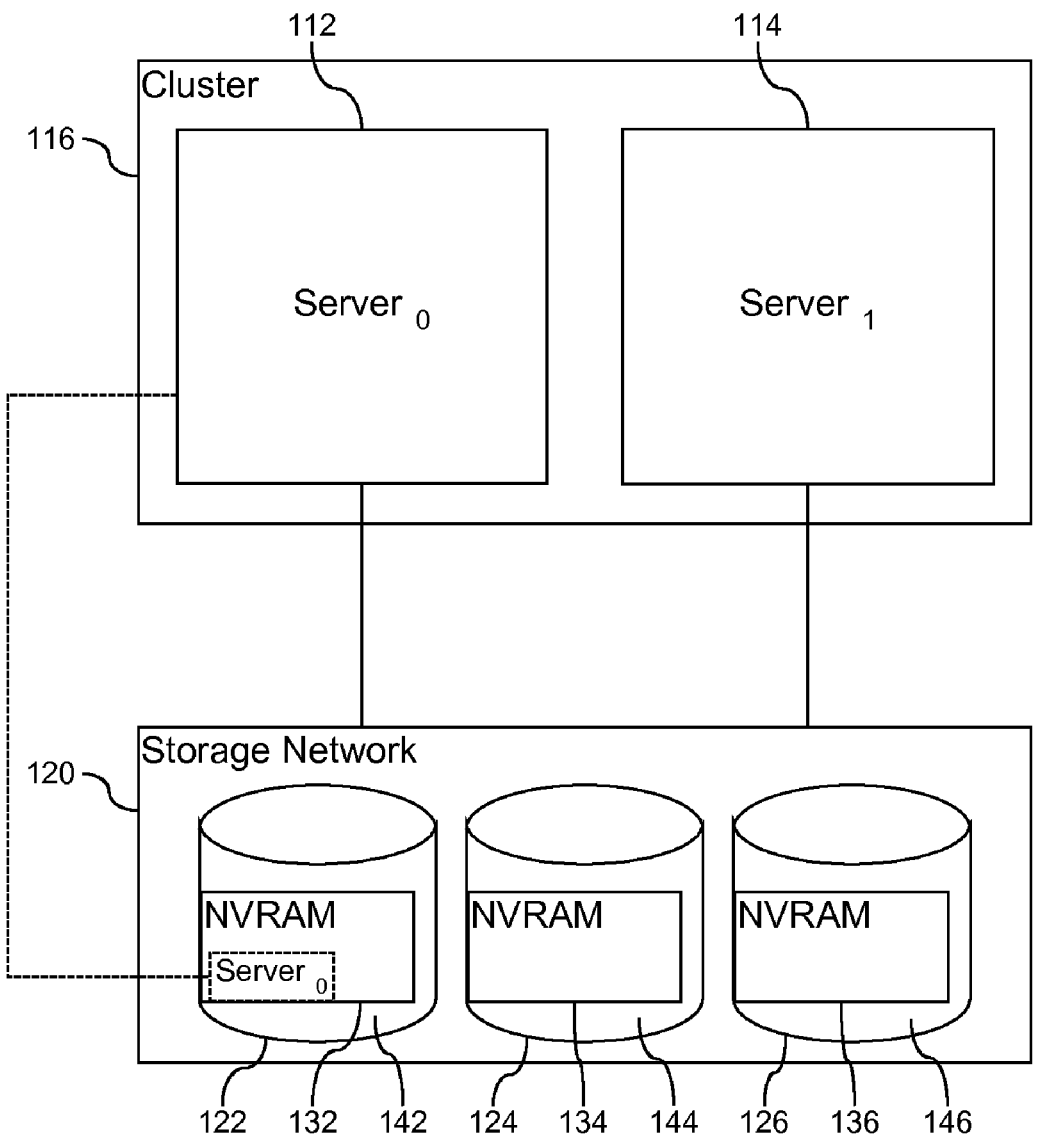
FIG. 1 is a block diagram of a computer system in communication with a storage network.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as channels of communication, flushing, etc, to provide a thorough understanding of embodiments of the invention. However, one skilled in the relevant art will recognize that the invention can be practiced without one or more of the specific details, or with other methods, components, materials, etc. In other instances, well-known structures, materials, or operations are not shown or described in detail to avoid obscuring aspects of the invention.

The illustrated embodiment of the invention will be best understood by reference to the drawings, wherein like part are designated by like numerals throughout. The following description is intended only by way of example, and simply illustrates certain select embodiments of devices, systems, and processes that are consistent with the invention as claimed herein.

Overview

It is recognized in the art that different classes of data in a computing environment perform different functions. More specifically, there is data and there is metadata. Data is defined as distinct pieces of information that are usually formatted in a special way; data can be in the form of bits and bytes stored in memory. Metadata is defined as data about data. Metadata describes how and when and by whom a particular set of data was collected and how the data is formatted. Metadata is essential to understanding information stored in data warehouses. Both data and metadata are stored on storage media. However, different protocols are employed in different computing environments for placement of both the data and the metadata on the storage media. Placement of the data and metadata on storage media may be directly or indirectly related to access thereof by requesting servers and or client machines in communication with the storage media.

The method, apparatus, and article of manufacture of the present invention provides valuable advantage over the prior art. According to the present invention, data is placed in one of the two sections of the hybrid storage media based upon the classification of the data and/or the physical location specified by a requesting computer system. In one embodiment, metadata may be written to the NVRAM section and data may be written to the physical storage section. Writing data to the NVRAM section of the storage media is faster than the physical section. Similarly, reading data from the NVRAM section is faster and may be conducted while the hybrid storage media is idle. An interface is provided to function with a hybrid storage media to manage placement and flushing of data from a NVRAM section of the storage media to the physical section so that specified data is retained in the NVRAM section.

Technical Details

In the following description, reference is made to the accompanying drawings that form a part hereof, and which is shown by way of illustration that specific embodiment in which the invention may be practiced. It is to be understood that other embodiments may be utilized because structural changes may be made without departing from the scope of the present invention.

In a highly available system, storage media are shared among two or more machines, such that if one machine fails, one of the others can provide access to the data stored on the shared storage media. In such environments, it is crucial that the data on the storage media not be accessed by multiple machines simultaneously to prevent data corruption. Granting of access to the individual storage media is known in the art as disk arbitration. Typical prior art for arbitration among N servers for access to a set of storage media involves a heartbeat being exchanged between the servers, and when a primary server crashes, the secondary server detects a loss of heartbeat and takes over for the failed primary. In other words, arbitration for access to storage media is any process by which a user of a shared resource negotiates with other users for the right to use the resource.

FIG. 1 is a block diagram (100) of a computer system (110) in communication with a storage network (120). As shown, the computer system (110) is comprised of two servers (112) and (114). Although only two servers are shown herein, the invention should not be limited to two servers. In one embodiment, more than two servers may be members of the system (110). Furthermore, in one embodiment, the servers (112) and (114) are members of a computer cluster (116). A cluster is a collection of computers that are interconnected, typically at high-speeds, for the purpose of improving reliability, availability, serviceability and/or performance via load balancing. Often, clustered computers have access to a common pool of storage, and run special software to coordinate the component computers' activities. The cluster (116) is shown in communication with a storage network (120), which is itself comprised of three storage pools (122), (124), and (126). Each of the members (112) and (114) of the cluster (116) may access data retained on each of the separate storage pools (122), (124), and (126). Furthermore, in this illustration, each of the storage pools (122), (124), and (126) are in the form of a hybrid storage media, with each individual storage pool having a NVRAM section and a physical storage section. As shown, storage pool (122) has NVRAM (132) and physical storage (142), storage pool (124) has NVRAM (134) and physical storage (144), and storage pool (126) has NVRAM (136) and physical storage (146).

In a cluster environment, it is known that the cluster leader has ownership of the quorum disk. Server clusters require a quorum resource to function. The quorum resource, like any other resource, is a resource which can only be owned by one server at a time, and for which servers can negotiate for ownership. The quorum resource is a storage device that holds cluster management data. Negotiating for the quorum resource allows server clusters to avoid situations where the servers are active and think the other servers are down. This can happen when, for example, the cluster interconnect is lost and network response time is problematic. The quorum resource is used to store the definitive copy of the cluster configuration so that regardless of any sequence of failures, the cluster configuration will always remain consistent. As shown in FIG. 1, server (112) is the cluster leader and has ownership of the quorum storage pool (122), with the arbitration data for the ownership residing in the NVRAM section (132) of the storage pool (122). In one embodiment, ownership of a storage pool is determined by which server writes ownership to the NVRAM section of the respective storage pool. Based upon the illustration herein, ownership of storage pool (122) is determined by which server writes ownership to NVRAM (132), ownership of storage pool (124) is determined by which server writes ownership to NVRAM (134), and ownership of storage pool (126) is determined by which server writes ownership to NVRAM (136). Accordingly, in the example shown herein storage pool (122) is the quorum disk in the cluster (116) with ownership of the quorum disk identifying the cluster leader as server (112).

In the invention herein, disk arbitration data is originally written to the NVRAM section of the associated hybrid storage pool and is not flushed to the physical storage. The cluster server or servers sharing access to the hybrid storage media write and maintain disk arbitration data on the NVRAM portion of the storage media, which may operate while the storage media is idle. The NVRAM portion of the storage media does not require the storage media to be spinning in order to read and write data to this portion of the storage media. Failover and arbitration in cluster environment are addressed faster in a hybrid storage media, with the disk arbitration data retained exclusively on the NVRAM portion and not subject to flushing, than in either a non-hybrid storage media or a hybrid storage media without the exclusive designation in the NVRAM portion. In one embodiment, failover and arbitration are not dependent upon the spin state of the storage media. Writing cluster management data to the NVRAM portion of the quorum device may occur while the storage media is in an idle state.

Figure 2:
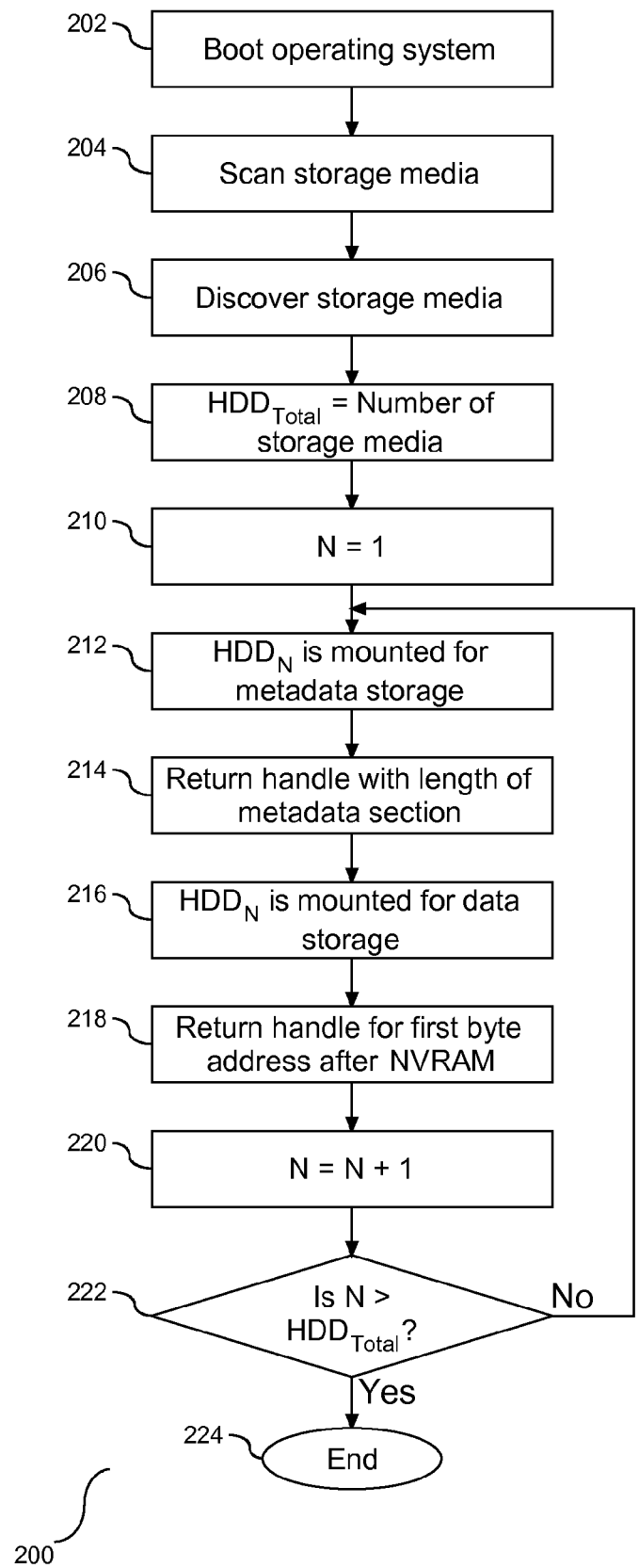
FIG. 2 is a flow chart illustrating a process for separating the NVRAM section and the physical section of the hybrid storage media.

As shown herein, in a cluster environment, a hybrid storage device may be employed to retain disk arbitration data in the NVRAM portion of the hybrid storage media. In order to retain the benefits of the hybrid storage media, the disk arbitration data must remain in the NVRAM portion and not be subject to flushing to the physical storage section of the hybrid storage media. FIG. 2 is a flow chart (200) illustrating a process for separating the NVRAM section of the hybrid storage media from the physical storage section. A first section is designated for a first class of data intended to be retained in the NVRAM section, and a second section is designated for a second class of data subject to flushing into the physical section of the storage media. As shown, the operating system boots (202) and scans the storage media (204) to discover the storage media that are in communication with the operating system. In one embodiment, there may be multiple storage media in communication with the operating system. The description below will be for a storage network with a plurality of storage media. Initially, a discovery of the total number of storage media in communication with the operating system is conducted (206), and this number is assigned to the variable $HDD_{Total}$ (208). Following the discovery at step (208), a counting variable N, is assigned to the integer 1 (210). Mounting the hybrid storage media includes accounting for metadata storage and data storage. The description below discusses accounting for the metadata storage first, although the order of the mounting can be reversed. As shown, the $HDD_N$ is mounted for metadata storage (212), followed by returning a handle to the beginning of the metadata section of the NVRAM with the length of the metadata section (214). Step (214) designates a specific location in the $HDD_N$ exclusively for metadata storage. Data from the metadata storage is not subject to flushing to the physical storage. Following the assignment at step (214), $HDD_N$ is mounted for data storage (216), followed by returning a handle to the first byte address after the NVRAM section (218). The first byte address is an indicator representing the beginning of the physical section of the storage media designated for data storage. Following step (218), the counting variable N is incremented (220) followed by a determination as to whether the value of the counting variable exceeds the total quantity of discover storage media $HDD_{Total}$ (222). A negative response to the determination at step (222) is followed by a return to step (212), and a positive response to the determination at step (222) is followed by a conclusion of the mounting of the discovered hybrid storage media (224). As shown herein the NVRAM section is designated for receiving metadata and the physical section of the hybrid storage media is designated to receive data. The respective sections of the hybrid storage media are separated by the physical boundaries of the respective sections as defined by the byte ranges.

In one embodiment, a first byte range of the storage media is associated with data designated exclusively for the NVRAM section, such as metadata. A second byte range of the storage media is associated with data designated exclusively for the physical section, such as data. The first and second byte ranges are distinct ranges that do not overlap. Data that is written to the first byte range is retained in the NVRAM section, and data that is written to the second byte range is retained in the physical section. In one embodiment, there is no flushing of data from the NVRAM section to the physical section. Similarly, in one embodiment, data is assigned to a section of the hybrid storage media based upon the classification of the data. For example, data that is representative of one class, such as metadata, is assigned to the NVRAM section to be exclusively retained therein and not subject to flushing to the physical section. Data that is representative of a second class is assigned to the physical section, and data that is representative of a third class is originally assigned to the NVRAM section and is subject to flushing to the physical section based upon a caching protocol associated with the hybrid storage media.

Figure 3:
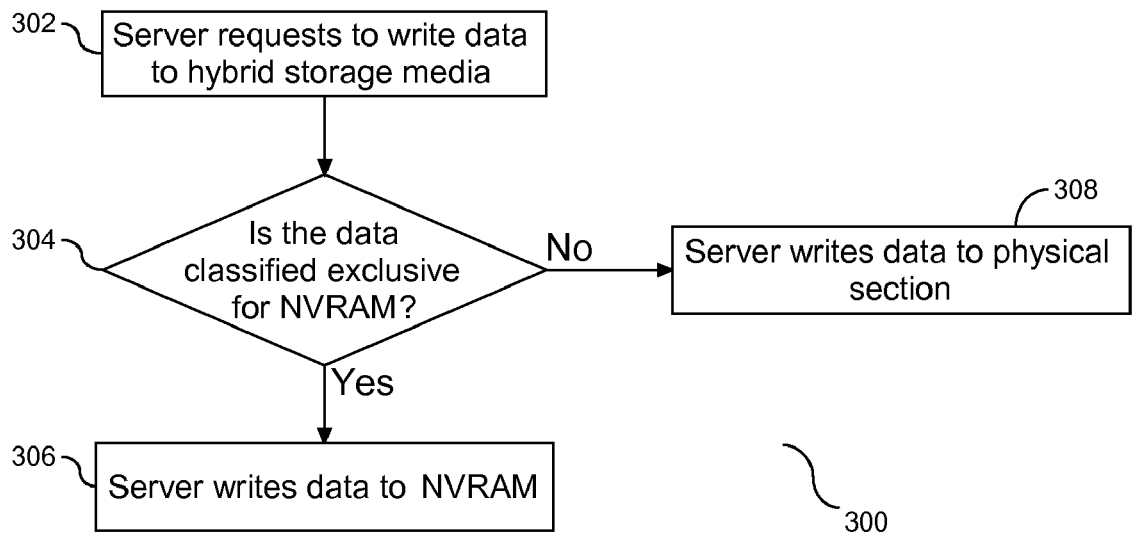
FIG. 3 is a flow chart illustrating a process for determining an appropriate section for storage of data in the hybrid storage media based upon classification of the data.

Once the boundaries for assignment of data and the properties associated therewith are set, as shown in FIG. 2, an interface is employed for placement of data in the appropriate section of the hybrid storage media. FIG. 3 is a flow chart illustrating a process for determining an appropriate section for storage of data in the hybrid storage media based upon classification of the data. As shown, a server requests to write data to the hybrid storage media (302). In relation to the cluster environment shown in FIG. 1, either server (112) or (114) may request to write data to any of the hybrid storage media (122), (124), and (126). A determination is conducted to determine whether the data is classified exclusive for NVRAM (304). Examples of data classification may include whether the server is writing data or metadata. A positive response to the determination at step (304) is followed by the server sending the data to the NVRAM section of the storage media (306). As noted above, metadata may be classified to be written exclusively to the NVRAM section and not subject to flushing to the physical section. A negative response to the determination at step (304) is followed by the server writing the data to the physical section of the storage media (308), as this is an indication that the data is not classified for exclusive retention in either the NVRAM section of the hybrid storage media. Accordingly, as shown herein, there are two classifications of data, with two of the classes having an exclusive assignment to one of the two sections of the storage media.

Figure 4:
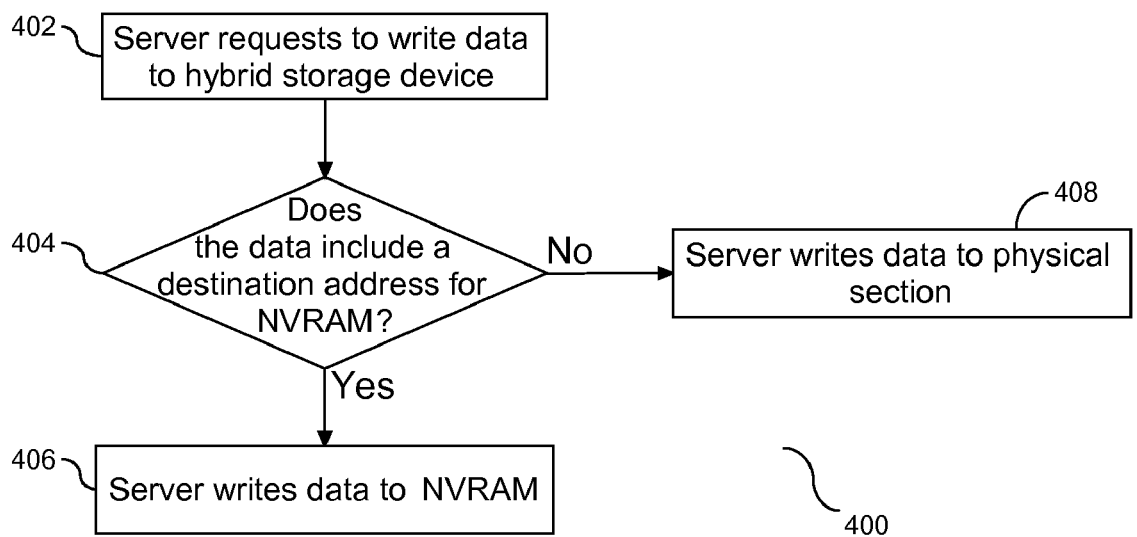
FIG. 4 is a flow chart illustrating writing data from a requesting server to a section of the hybrid storage media based upon an associated address.

As noted above, the data may be assigned to a section of the hybrid storage media based upon an address associated with a write request. FIG. 4 is a flow chart illustrating writing data from a requesting server to a section of the hybrid storage media based upon an associated address. As shown, a server requests to write data to the hybrid storage media (402). In relation to the cluster environment shown in FIG. 1, either server (112) or (114) may request to write data to any of the hybrid storage media (122), (124), and (126). A determination is conducted to determine whether the data write request includes a destination address in the NVRAM section of the storage device (404). As noted above in FIG. 2, the NVRAM section may have a first set of byte addresses, and the physical section may have a second set of byte addresses. A positive response to the determination at step (404) is followed by the server writing data to the NVRAM section of the storage device (406). In contrast, a negative response to the determination at step (404) is followed the server writing the data to the physical section of the storage media (408). Accordingly, assignment of an address range to the different sections of the storage media together with a write request having an address range enables the data to be written to the designated section of the hybrid storage media.

Figure 5:
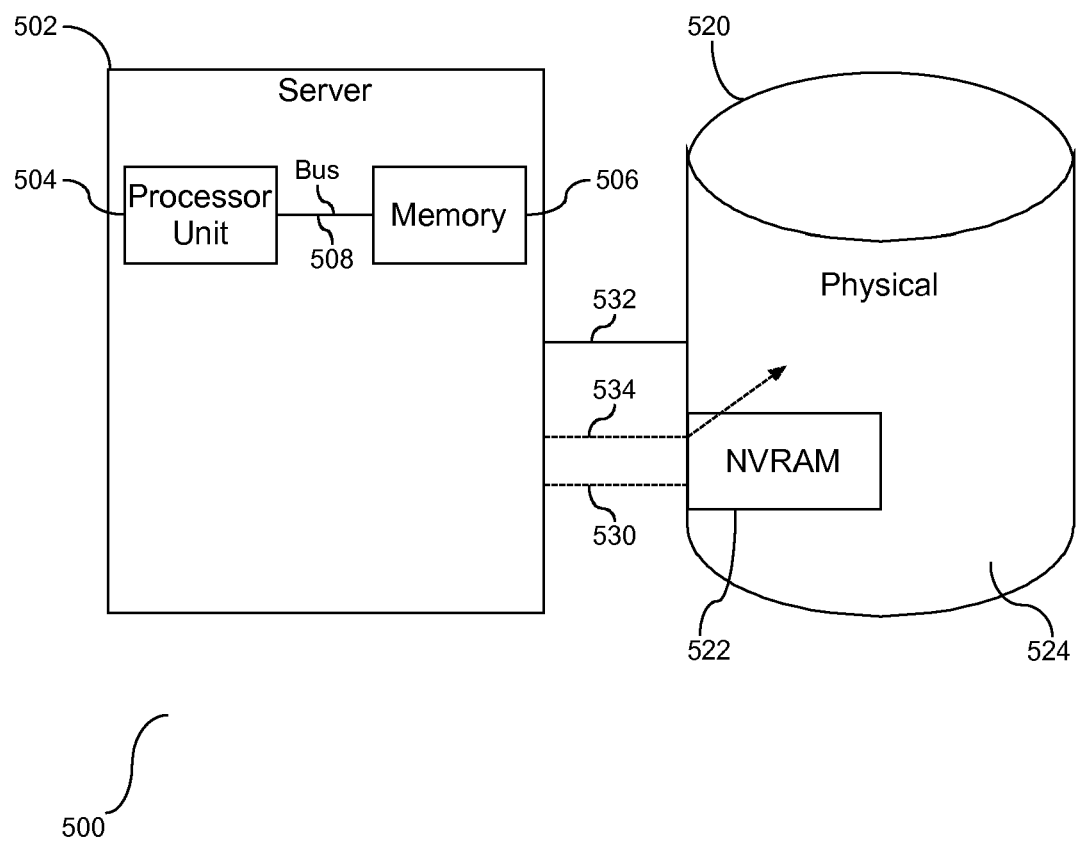
FIG. 5 is a block diagram of a computer system that employs multiple channels for communication with the storage media.

As shown in FIGS. 3 and 4, data may be written to one of the two sections of the hybrid storage device based upon classification of the data and/or an assigned address with the data. Data is written originally to the NVRAM section and retained therein, or written to the physical section and retained therein. Data written in the NVRAM section is not subject to flushing. Different channels may be employed for writing data from the server to the hybrid storage media. FIG. 5 is a block diagram (500) of a computer system that employs multiple channels for communication with the storage media. As shown, a server (502) is provided with a processor unit (504) coupled to memory (506) via a bus structure (508). The server (502) is shown in communication with the hybrid storage media (520), which includes a NVRAM section (522) and a physical section (524). Two channels of communication are employed between the server (502) and the hybrid storage media. A first channel (530) provides direct communication from the server (502) to the NVRAM section (522) of the storage media (520). A second channel (532) provides direct communication from the server (502) to the physical section (524) of the storage media (520). In one embodiment, a third channel (534) may provide indirect communication from the server (502) to the physical section (524) via the NVRAM section (522). Data written to the storage media via the third channel is subject to flushing to the physical section (524). More specifically, data communicated via the third channel may be designated as such in an associated address range or data classification along similar logic to that shown in FIGS. 3 and 4, wherein this class of data is flushed from the NVRAM section to the physical section based upon a separate cache protocol. In one embodiment, metadata is processed via the first channel (530) and data is processed via the second and third channels (532) and (534), respectively. Accordingly, different channels of communication may be employed between the server (502) and the hybrid storage media (520) based upon the classification and/or address range of the data.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain the program for use by or in connection with the instruction execution system, apparatus, or device.

Figure 6:
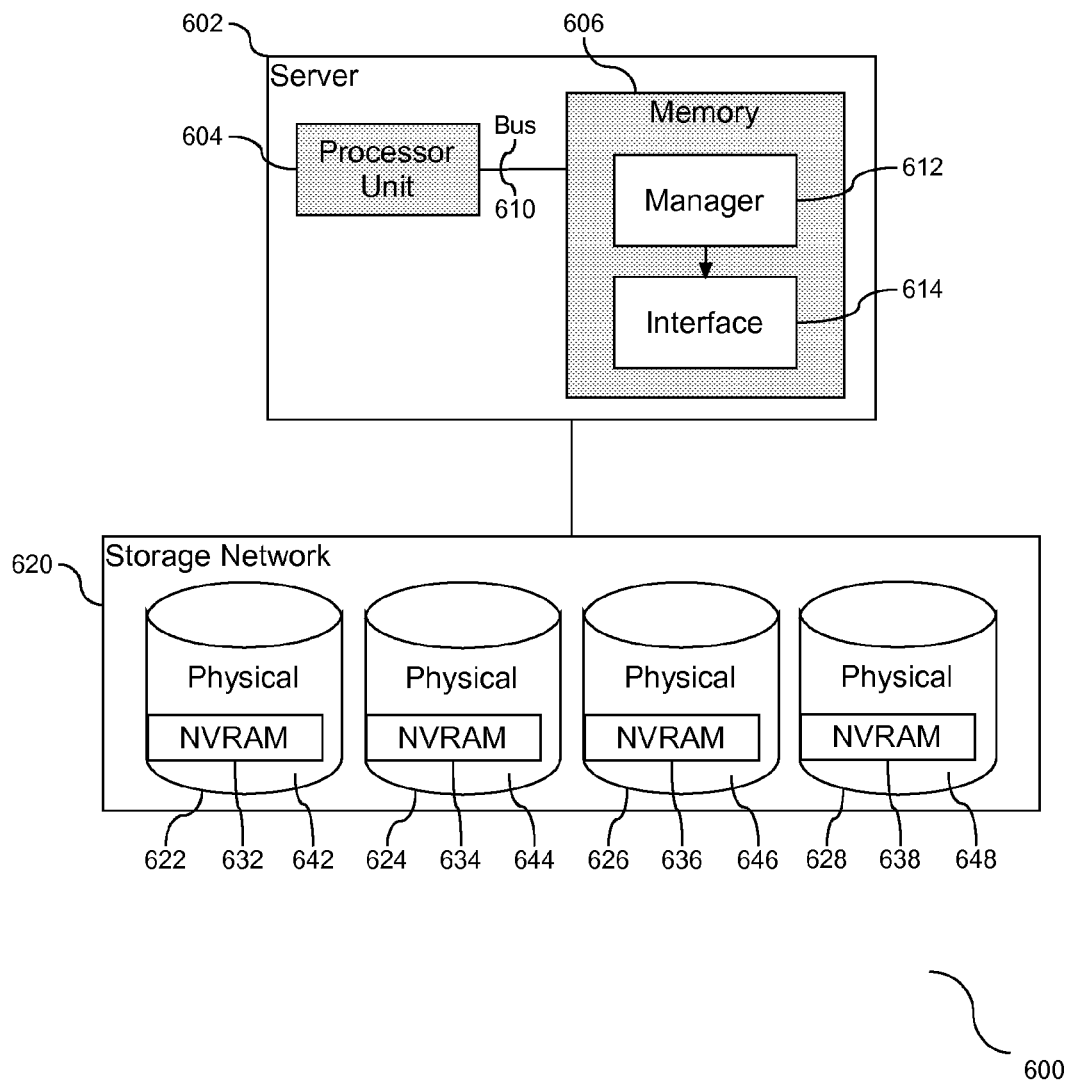
FIG. 6 is a block diagram illustrating placement of a hybrid storage media interface in a computer system, according to the preferred embodiment of this invention, and is suggested for printing on the first page of the issued patent.

FIG. 6 is a block diagram (600) illustrating placement of hybrid storage media interface in a computer system. The illustration shows a server (602) with a processor unit (604) coupled to memory (606) by a bus structure (610). Although only one processor unit (604) is shown, in one embodiment, the server (602) may include more processor units in an expanded design. As shown in FIG. 6, the server (602) is in communication with a storage network (620), which is shown herein with a plurality of hybrid storage pools (622), (624), (626), and (628). Although four storage pools (622)-(628) are shown herein, the invention should not be limited to the quantity of storage pools illustrated. In one embodiment, the storage network (620) may have a smaller quantity of storage pools or a greater quantity of storage pools. Each storage pool is shown with two sections, an NVRAM section and a physical section. More specifically, storage pool (622) is shown with NVRAM section (632) and physical section (642). Storage pool (624) is shown with NVRAM section (634) and physical section (644). Storage pool (626) is shown with NVRAM section (636) and physical section (646). Finally, storage pool (628) is shown with NVRAM section (638) and physical section (648).

Data management tools are utilized in the form of a manager (612) in communication with an interface (614). Both the manager (612) and the interface (614) are shown residing in memory (606) of the server (602). The manager (612) categorizes the data for presentation to the interface (614), followed by the interface (614) selecting a channel of communication of the data to the storage media. The categorization of the data is determinative of channel that is selected by the interface (614), as described in FIG. 3-5 above. The manager (612) may utilize instructions in a computer readable medium to evaluate the data for assignment to a category and to communicate the categorization to the interface (614). Similarly, the interface (614) may utilize instructions in a computer readable medium to communicate data on at least one of the channels to an appropriate section of the storage device.

Although the manager (612) and the interface (614) are shown residing in memory, the invention should not be limited to this embodiment. In one embodiment, the manager (612) and the interface (614) may individually or in combination reside as a hardware tools external to memory (606), or they may be implemented as a combination of hardware and software tools. Accordingly, the manager (612) and interface (614) may be implemented as a software tool or a hardware tool to facilitate mediation and management of hybrid storage devices.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

Placement of data or metadata in the NVRAM section of the storage device that is not subject to flushing to the physical storage enables select data to be managed in a section of memory known as flash memory. Similarly, by classifying data based upon content or address location, a select channel may be employed to write the data directly to the NVRAM section and not subject to flushing, write the data directly to the NVRAM section subject to flushing based upon a caching protocol, or write the data directly to the physical section of the storage media. It is known in the art that writing to flash memory is faster than writing to physical memory. In the case of a cluster environment where ownership data resides in the NVRAM section, a cluster member may read ownership data directly from flash memory. Similarly, flash memory does not require spinning of the disk. This enables reading and writing to the NVRAM section regardless of the spin state of the storage media. Furthermore, the mean time between failures (MTBF) of the NVRAM section of the storage device is significantly greater than the MTBF for the physical section. As such, the NVRAM section is a more secure location on the storage device. Accordingly, granular management of data and the associated hybrid storage media may be employed to leverage the hybrid storage media and the properties of the NVRAM section thereof.

Alternative Embodiments

It will be appreciated that, although specific embodiments of the invention have been described herein for purposes of illustration, various modifications may be made without departing from the spirit and scope of the invention. In particular, a select byte range in the hybrid storage media may be designated for a third class of data, wherein this class of data is originally written in the NVRAM section and is subject to flushing to the physical section based upon a caching protocol. Similarly, a third classification may be provided that indicates the data should be written to the NVRAM, but that this data is subject to flushing from the NVRAM to the physical section. By employing a third categorization for the data, three channels of communication may be employ, one direct from the server to NVRAM, a second direct from the server to the physical section, and a third from the NVRAM to the physical section. Accordingly, the scope of protection of this invention is limited only by the following claims and their equivalents.

I claim:

1. A method for managing storage media, comprising:
    configuring a system with cluster servers in communication with a hybrid storage media, with the hybrid storage media including a physical section and a separate non-volatile RAM (NVRAM) section;
    assigning a first class of data for exclusive retention in the NVRAM section of the hybrid storage media, said first class of data including storage media arbitration data, and said first class of data not subject to flushing to the physical section;
    said arbitration data, written to the NVRAM by the servers, controlling access to the hybrid storage media by the servers;
    assigning a second class of data for retention in the physical section of the hybrid storage media; and
    retaining the first class of data in the NVRAM section of the hybrid storage media based upon the assignment.

2. The method of claim 1, further comprising assigning a third class of data for original retention in the NVRAM section of the hybrid storage media, wherein the third class is subject to flushing from the NVRAM section to the physical section as defined in a caching protocol.

3. The method of claim 2, further comprising configuring a first channel of communication with the hybrid storage device for flushing data from the NVRAM section to the physical section.

4. The method of claim 1, further comprising configuring a second channel of communication with the hybrid storage device for writing data exclusively retained in the NVRAM section.

5. The method of claim 4, further comprising communicating metadata from a server in communication with the storage device to the NVRAM section via the second channel.

6. The method of claim 1, further comprising categorizing data based upon content, wherein the categorization is determinative of assignment of data subject to flushing to the physical drive and assignment of data exclusively to the NVRAM section.

7. The method of claim 1, further comprising assigning data with a specified byte range to the NVRAM section and assigning data absent the specified byte range to the physical section.

8. The method of claim 1, further comprising assigning cluster communication data to the NVRAM section.

9. The method of claim 1, further comprising assigning cluster arbitration data to the NVRAM section, said arbitration data controlling access of servers in a cluster in communication with the hybrid storage media to physical and NVRAM sections of the hybrid storage media.

10. A computer system, comprising:
    cluster servers in communication with a storage network;
    at least one hybrid storage media in the storage network, with a non-volatile RAM (NVRAM) section and a separate physical section;
    a manager to categorize the data for presentation to an interface, including a first category of data to be retained exclusively in the NVRAM section, and a second category of data to be retained exclusively in the physical storage, said first category of data including storage media arbitration data controlling access to the sections of the at least one hybrid storage media;

said arbitration data, written to the NVRAM by said servers, to control access to the hybrid storage media by said servers, and said first category of data not subject to flushing to the physical section; and an interface in communication with the NVRAM section to select a channel for communication of data from the server to the storage media.

11. The system of claim 10, further comprising a first channel in communication with the interface to write data assigned to the first category exclusively to the NVRAM section.

12. The system of claim 11, further comprising metadata communicated to the NVRAM section via the first channel from a server in communication with the storage media.

13. The system of claim 10, further comprising a second channel in communication with the interface to write data assigned to the second category directly to the physical section.

14. The system of claim 10, further comprising a manager to categorize data prior to presentation to the interface, wherein the categorization is determinative of data subject to flushing to the physical drive and data subject exclusively to the NVRAM section.

15. The system of claim 10, further comprising a manager to assign data with a specified byte range to the NVRAM section and assign data absent the specified byte range to the physical section.

16. An article comprising:
a computer readable medium including computer program instructions configured to manager storage media, comprising:
instructions to configure a hybrid storage device, said hybrid storage device configured with a physical section and a separate non-volatile RAM (NVRAM) section; and instructions to manage flushing of data from the NVRAM section to the physical section, including retention of a first class of data in the NVRAM section and a second class of data subject to assignment to the physical section, said first class of data including storage media arbitration data controlling access to the sections of the hybrid storage media, said arbitration data, written to the NVRAM by servers, controlling access of said servers to the hybrid storage media, and said first class of data not subject to flushing to the physical section; and retaining the first class of data exclusively in the NVRAM section.

17. The article of claim 16, further comprising instructions to configure a first channel of communication with the hybrid storage device for communicating data from a server directly to the NVRAM section.

18. The article of claim 16, further comprising instructions to configure a second channel of communication with the hybrid storage device for writing data from the server directly to the physical section.

19. The article of claim 16, further comprising instructions to categorize data based upon content, wherein the categorization is determinative of assignment of data to the NVRAM section and the physical section.

20. The article of claim 16, further comprising instructions to assign data to one of the two sections of the storage media based upon a specified byte range, including assignment of data with a specified byte range to the NVRAM section and assignment of data absent the specified byte range to the physical section.

* * * * *